July 15, 1930.  A. P. PRENDERGAST  1,770,860
SPRING RIGGING FOR LOCOMOTIVES AND OTHER VEHICLES
Filed April 4, 1929  2 Sheets-Sheet 1
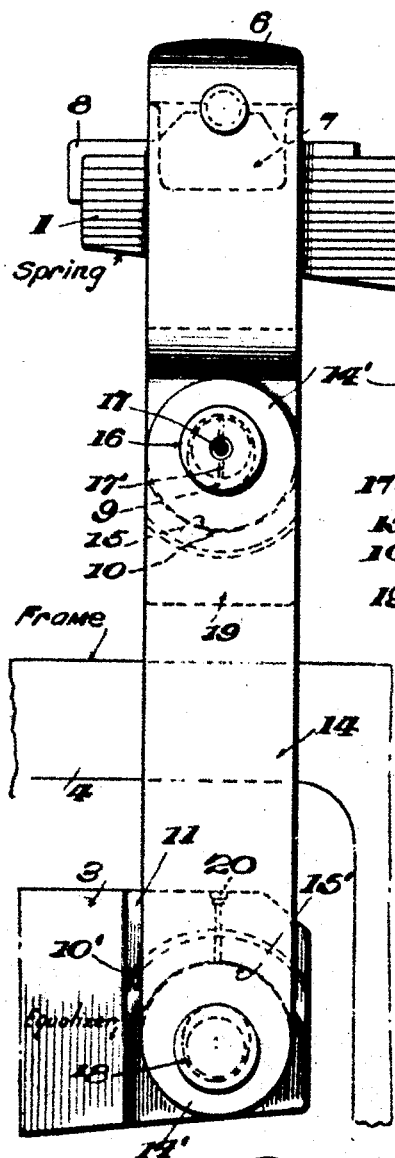
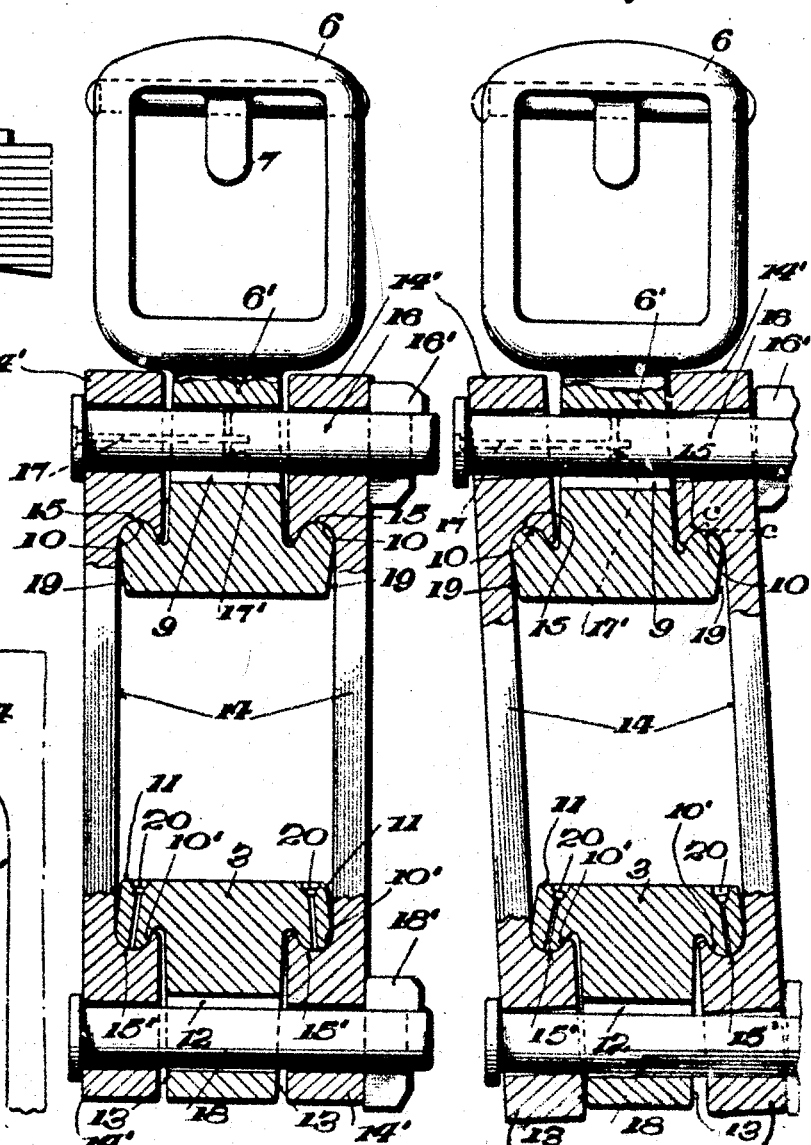
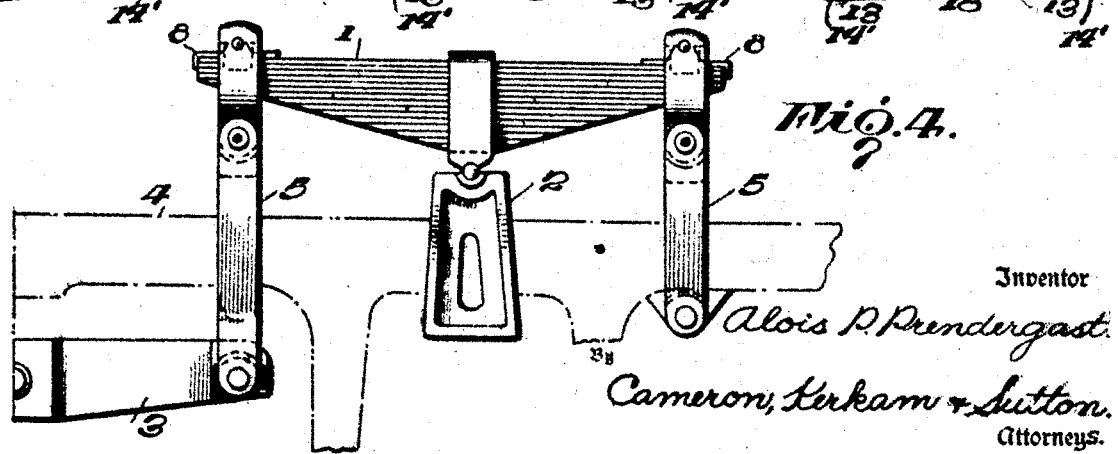
Inventor
Alois P. Prendergast.
Cameron, Kerkam & Sutton.
Attorneys.

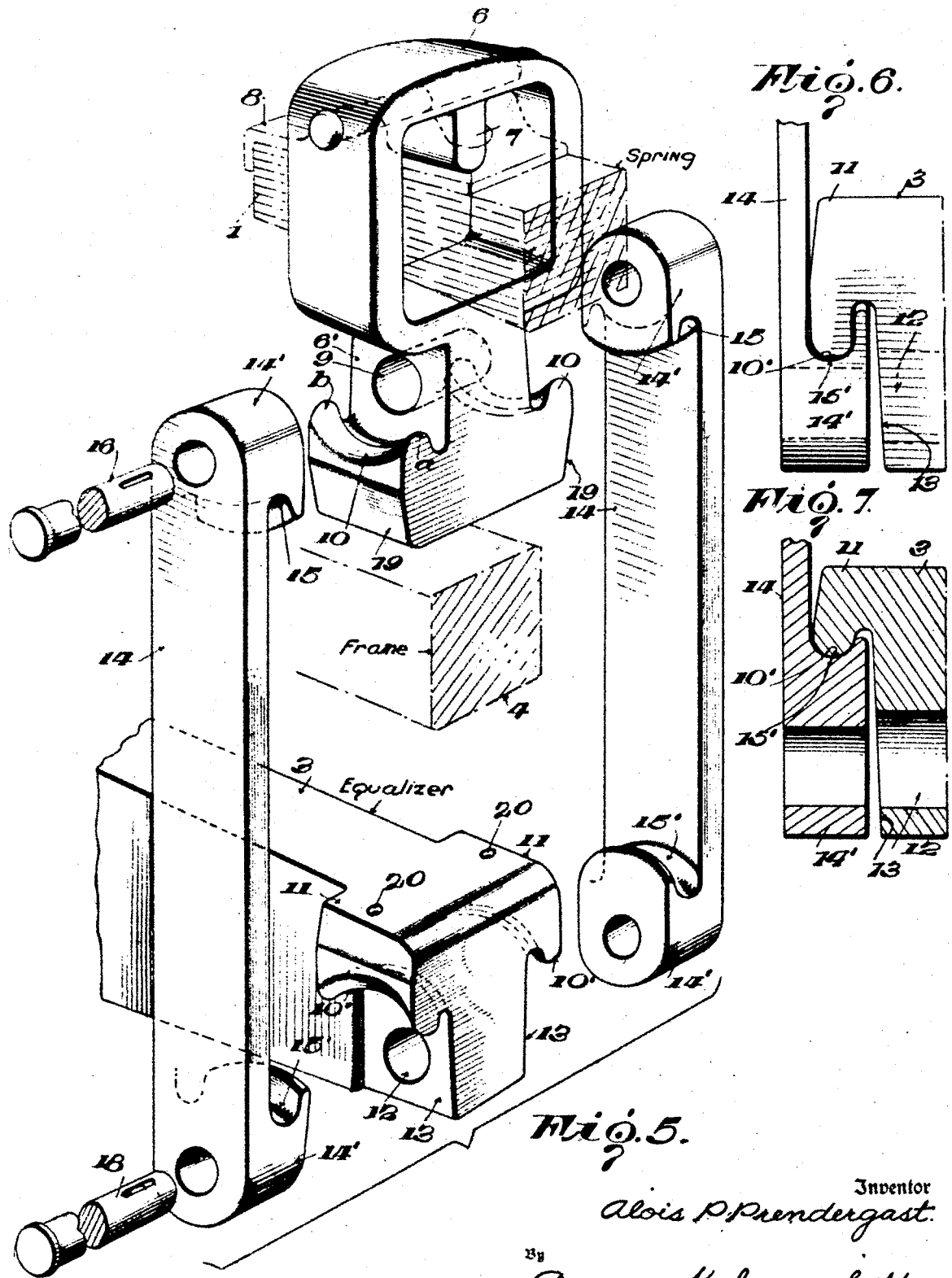

Patented July 15, 1930

1,770,860

UNITED STATES PATENT OFFICE

ALOIS P. PRENDERGAST, OF DALLAS, TEXAS

SPRING RIGGING FOR LOCOMOTIVES AND OTHER VEHICLES

Application filed April 4, 1929. Serial No. 352,576.

This invention relates to flexible connections for spring rigging, brake rigging and the like for railway locomotives, cars and other vehicles and is an improvement upon the construction shown, described and claimed in my U. S. Patent No. 1,608,668, granted November 30, 1926.

In large and extremely heavy vehicles, such as locomotives for example, the weight to be supported by the springs is suspended on the springs by connecting elements to afford yielding action in order to prevent distortion or breaking of such elements under the enormous strains to which they are subjected. In my aforesaid patent such connecting element is formed in sections united by engaging complementary surfaces designed to permit flexibility of the sections with relation to each other, not only backward and forward in line with the locomotive, but also transversely, to the end that the connection may yield within limits without subjecting the same to undue bending or breaking strains. These complementary surfaces were semi-circular in form, in a line parallel with the movement of the locomotive backward or forward, and were undercut to the end that the strains imposed by the load would tend to force the elements into intimate contact and serve to draw the parts together and obviate spreading.

The present invention has for its object to improve the flexible connection of the aforesaid patent, preserve all of the flexible and other desirable features thereof, and at the same time very materially reduce the bending or breaking strain imposed upon said section by the enormous weight supported thereby. This result is accomplished by a change in the construction of the complementary surfaces whereby the leverage through which the strains to the connecting parts is applied is materially reduced. Broadly stated this is accomplished by so constructing the complementary engaging surfaces of the flexible connection that they are arcuate in cross sections taken at a right angle to each other, as for example, sections of an approximately circular torus. Other specific details of improvement will appear as the description of the invention proceeds.

Within limits the inventive idea involved may be varied in its mechanical expression and, for the purpose of illustration, one of these mechanical expressions is shown in the accompanying drawings, but it is to be understood that the invention is not limited to the specific construction shown, reference being had to the appended claims for this purpose.

In said drawings—

Fig. 1 is a side elevation of the flexible connection between a locomotive spring and the equalizer of the locomotive through which the load is transmitted to the spring;

Fig. 2 is a central vertical section with parts in elevation, and showing the parts in their normal position;

Fig. 3 is a section similar to Fig. 2, but showing the parts in the position which they assume due to the swaying of the engine, or otherwise, imparting a lateral movement to said connecting parts;

Fig. 4 is a diagrammatic view in side elevation illustrating generally the manner in which the flexible connections are employed to support the load on the locomotive spring;

Fig. 5 is a perspective view showing the various parts of the flexible connection separated in order that their construction may be readily understood;

Fig. 6 is a broken side elevational detail showing the lower end of the connecting link in engagement with the end of the equalizer; and Fig. 7 is a central, vertical section through Fig. 6.

Referring to the drawings, in which corresponding numerals indicate like parts throughout the several views, and first to Fig. 4, 1 indicates a locomotive spring carried in spring stirrup 2 supported on the journal box or otherwise, and 3 indicates the usual equalizer. The flexible connections between the spring 1 and equalizer 3 are indicated generally by the reference numerals 5, 5, and 4 indicates the frame of the locomotive. The present invention relates more particularly to the flexible connections 5 between the springs and the supported structure, and as indicated above is designed to provide ample flexibility of these connections with a minimum of bending or breaking strains thereon.

Referring to Fig. 5, 6 is a suitable yoke or stirrup provided with a tongue 7 projecting downwardly from the interior face of the top of the yoke and into a suitable slot formed in the upper portion of the surface of the spring 1, which slot also extends through a protecting cap plate 8 preferably placed over the end of the spring. The yoke 6 is provided with a downwardly extending neck portion 6' whose lateral walls (that is the walls facing the opposite sides of the locomotive) are somewhat nearer together at the top than at the bottom, for a purpose which will hereinafter appear. This neck portion 6' has a transverse opening 9 extending therethrough from side to side, and below said opening said neck portion is enlarged so as to form laterally projecting shoulders thereon, which shoulders are provided with bearing surfaces 10, 10, having the form of a section of an approximately circular torus. The surface 10 between the points $a$, $b$, Fig. 5, is approximately that of the arc of a circle and, as will appear from an inspection of Fig. 5, at the point $a$, a transverse section of the surface 10 is also approximately that of the arc of a circle, thus the surface is arcuate in cross sections taken at right angles to each other. The equalizer 3 has on its end portion outwardly projecting shoulders 11, 11, on which are formed downwardly facing bearing surfaces 10', 10', corresponding in every particular to the surface 10, 10 formed on the yoke 6, except that these surfaces face downwardly instead of upwardly, and the equalizer has formed therethrough below said shoulders 11, 11 a transverse opening 12.

The faces 13, 13 of the end portion of the equalizer below the surfaces 10' are inclined slightly inward and downward so that the distance between said faces 13, 13 at the bottom portion thereof is slightly less than at the top portion thereof, for a purpose which will hereinafter appear.

The yoke 6 and the equalizer 3 are flexibly connected together by means of two oppositely disposed, exactly similar links 14, 14, the detail construction of which is clearly shown in Fig. 5. Each of these links is in the form of a vertically extending bar having on the upper and lower ends thereof inwardly projecting bosses or shoulders 14', on which shoulders are formed bearing surfaces 15, 15' complementary to the bearing surfaces 10, 10', formed on the yoke 6 and the equalizer 3, to the end that when the links 14, 14 are assembled as shown in Fig. 2, the surfaces 10, 10 on the yoke will be engaged by the complementary surfaces 15, 15 on the links, and the surface 10', 10' on the equalizer will be engaged by the surfaces 15', 15' on the links, thereby transmitting the weight bearing on the equalizer through the links and the yoke to the locomotive spring.

When the parts are thus assembled preferably a pin 16 is passed through openings formed in the upper ends of the links and the opening 9 in the neck of the yoke and secured therein by any suitable means, as a key 16'. By referring to Figs. 2 and 3 it will be seen that the diameter of the pin is less than that of the openings through the links and also less than that of the opening 9 through the neck of the yoke. This latter opening is enlarged, so that no strains can possibly come on the pin when the links are in tension, until the bearing surfaces 10, 10 and 15, 15 become worn to a considerable extent. In cases where compression strains on the links are negligible, the pin may be omitted entirely, as the several elements comprising the connection will not separate, due to the interlocking feature of the bearing surfaces. If in some applications compression stresses do exist in the links, the pin will prevent the separation of the parts comprising the connection.

Preferably the pin 16 is provided with a lubricating channel 17, Fig. 2, extending longitudinally from one end of the pin to the center portion thereof and there communicating with a transverse channel 17' leading to the periphery of the pin, whereby the lubricant can be transmitted through the pin and the opening formed in the neck of the yoke, and thence downward to the bearing surfaces 10, 10. In a similar way a pin 18, Fig. 2 extends through the lower ends of the links 14 and through the opening 12 in the end of the equalizer, the diameter of this pin being less than the diameter of the openings through the links and considerably less than the diameter of the opening 12 in the equalizer and, like the pin 16, and for a similar purpose. In this case the lubricant for the bearing and journal surfaces 10', 15', respectively, is transmitted thereto through lubricating channels 20, 20 formed in the end of the equalizer and leading down to said surfaces.

By reference to Fig. 2 it will be seen that the lateral faces of the neck 6' below the bearing surfaces 10, 10 incline slightly inward from the links, as shown at 19, 19 and it will also be seen that when the journal surfaces 15, 15 are in engagement with the surfaces 10, 10 in their normal position the inner faces of the bosses on the upper ends of the links 14, 14 do not come in contact with the neck 6', whereby space for lateral movement is afforded. The same freedom of lateral movement is provided at the lower end of the links by reason of the downwardly inclined faces 13, 13 of the end of the equalizer.

*Operation.*—With the parts assembled and in normal position as shown in Figs. 1, 2 and 4, it will be seen that any swaying motion longitudinally of the engine will be readily taken care of by the swinging of the links 14, 14 backward or forward which is permitted by the complementary bearing surfaces 10 and 15 at the top and 10′, 15′ at the bottom and without imposing any bending or breaking strains on the links or associated parts. Any lateral swaying which would cause a movement of the equalizer to one side or the other, such, for example as indicated in Fig. 3, will also be permitted within the limits of the play of the parts without imposing any additional bending or breaking strains due thereto on the links. The surfaces 10—15, 10′—15′, respectively, remain in constant contact, and this results in a minimum leverage c—c, Fig. 3, and hence reduces the bending or breaking strains to a minimum.

It will thus be seen that there is provided a highly flexible connection between the locomotive spring and the equalizer or other load bearing connection which is extremely flexible, both laterally and longitudinally of the locomotive, which is extremely simple in construction and which reduces to a very large extent the bending or breaking strains imposed upon said connections. It will further be readily appreciated that in case one of the connecting links 14 should break in use, the engineer with the use of simple tools can readily replace the broken link with a like link, or, in the absence of such link, can substitute a bar of metal perforated at each end, and by passing pins 16 and 18 therethrough carry the locomotive safely into the repair shop.

While the preferred form of the invention is shown in the accompanying drawings, it will be understood that the invention is not limited thereto, but that modifications may be made therein without departing from the true spirit of the invention. Thus, the complementary surfaces 10, 15 on the yoke and links might be reversed, the surface 10 being formed on the link and the surface 15 on the yoke. The same is true of the surfaces 10′ and 15′ on the equalizer and the link. Furthermore, the connection between the spring and links need not necessarily be in the form of a yoke. Other modifications may be made within the spirit of the invention, and such as fall within the terms of the appended claims are intended to be covered thereby.

What is claimed is:

1. In a spring rigging, the combination of a spring, a yoke flexibly mounted on said spring, an equalizer, and a flexible connection between said yoke and equalizer, said connection including two flexible joints, one at the yoke and one at the equalizer, each of said joints having complementary engaging surfaces one of which is a section of an approximately circular torus.

2. In a spring rigging for locomotives, cars and other vehicles, the combination of a spring and a part of the vehicle to be supported thereby, with a flexible connection between said spring and part, said connection comprising an element engaging the spring, two oppositely disposed supporting surfaces fixed relative to each other and integral with said element, said surfaces each forming a section of an approximately circular torus, two oppositely disposed depending bars, each having a surface complementary to and engaging one of said supporting surfaces, and flexible connecting means between said bars and the supported part of the vehicle.

3. In a spring rigging for locomotives, cars and other vehicles, the combination of a spring and a part of the vehicle to be supported thereby, with a flexible connection between said spring and part, said connection comprising an element carried by the spring and having a bearing surface integral therewith, the bearing surfaces of said elements being fixed transversely relative to each other and the bearing surfaces of said part being likewise fixed transversely relative to each other, each of said bearing surfaces forming a section of an approximately circular torus, a pair of oppositely-disposed depending bars each having at one end a surface complementary to and engaging the torus section on said element, and on the other end a surface complementary to and engaging the torus section on said part.

4. In a spring rigging for locomotives, cars and other vehicles the combination of a spring and a part of the vehicle to be supported thereby, with a flexible connection between said spring and part, said connection comprising an element flexibly engaging the spring, two oppositely-disposed supporting upwardly facing surfaces fixed relative to each other, and carried by said element, said surfaces each forming a section of an approximately circular torus, two oppositely disposed depending bars each having a surface complementary to and engaging one of said supporting surfaces, and flexible connecting means between said bars and the supported part of the vehicle.

5. In a spring rigging, the combination of a spring, and a part supported thereby and having a bearing surface integral therewith, with a flexible connection between said spring and part, said connection including a flexible joint having complementary engaging surfaces one of which is a section of an approximately circular torus, the said engaging surfaces in their movement being fixed transversely relative to each other.

6. In a spring rigging for locomotives, cars and other vehicles the combination of a spring and a part of the vehicle to be supported thereby, a yoke engaging the end of said spring and having a depending shank, oppositely - disposed laterally - extending shoulders fixed relative to each other on said shank, each of said shoulders having an upwardly-facing supporting surface forming a section of an approximately circular torus, two oppositely-disposed independent bars each having a surface complementary to and engaging one of said supporting surfaces, and flexible connecting means between said bars and the supported part of the vehicle.

7. In a spring rigging for locomotives, cars and other vehicles the combination of a spring and a part of the vehicle to be supported thereby, a yoke mounted on said spring and having a depending transversely-perforated shank, laterally-extending shoulders on said shank below said perforation, each of said shoulders having an upwardly facing supporting surface forming a section of an approximately circular torus, said surfaces being fixed against movement relative to each other, two oppositely-disposed independent bars each having a surface complementary to and engaging one of said supporting surfaces and each having a perforation above said complementary surface, a pin passing through said perforations in said bars and shank, and flexible connecting means between said bars and the supported part of the vehicle.

8. In a spring rigging for locomotives, cars and other vehicles the combination of a spring and a part of the vehicle to be supported thereby, a yoke carried by said spring, oppositely-disposed upwardly-facing supporting surfaces carried by said yoke and fixed against movement relative to each other, each of said surfaces forming a section of an approximately circular torus, two oppositely-disposed depending bars each having a surface complementary to and engaging one of the said supporting surfaces, and flexible connecting means between said bars and the supported part of the vehicle.

9. In a spring rigging for locomotives, cars and other vehicles the combination of a spring and a part of the vehicle to be supported thereby, a yoke mounted on said spring and having a depending transversely-perforated shank, laterally-extending shoulders on said shank below said perforation, each of said shoulders having an upwardly-facing supporting surface fixed against movement relative to the other and each forming a section of an approximately circular torus, two oppositely-disposed independent bars each having a surface complementary to and engaging one of said supporting surfaces and each having a perforation above said complementary surface, a pin of less diameter than and passing through said perforations in said bars and shank, and flexible connecting means between said bars and the supported part of the vehicle.

10. In a spring rigging, the combination of a spring, a yoke mounted on said spring, and an equalizer, said yoke and equalizer each having oppositely-disposed bearing surfaces each fixed against movement relative to its opposite surface and each in the form of an approximately circular torus, a pair of oppositely-disposed bars each having at one end a surface complementary to and engaging the torus section on said yoke and on the other end a surface complementary to and engaging the torus section on said equalizer.

11. In a spring rigging, the combination of a spring, a yoke mounted on said spring, and an equalizer, said yoke and equalizer each having oppositely-disposed bearing surfaces each fixed against movement relative to its opposite surface and each in the form of an approximately circular torus, a pair of oppositely-disposed bars each having at one end a surface complementary to and engaging the torus section on said yoke and on the other end a surface complementary to and engaging the torus section on said equalizer, and pins passing through openings in said bars and yoke and said bars and equalizer respectively, said pins being of less diameter than said openings.

12. In a spring rigging, the combination of a spring, a yoke mounted on said spring, a part to be supported, and a pair of oppositely-disposed bars connecting said yoke and part, the engaging surfaces between said yoke and bars and between said part and bars each being in the form of an approximately circular torus.

In testimony whereof I have signed this specification.

ALOIS P. PRENDERGAST.